US012752528B2

(12) United States Patent
Shoji

(10) Patent No.: US 12,752,528 B2
(45) Date of Patent: Oct. 6, 2026

(54) LIQUID EJECTION APPARATUS, RECORDING MEDIUM, AND LIQUID EJECTION HEAD

(71) Applicant: Konica Minolta, Inc., Tokyo (JP)

(72) Inventor: Ryo Shoji, Koganei (JP)

(73) Assignee: KONICA MINOLTA, INC., Tokyo (JP)

( * ) Notice: Subject to any disclaimer, the term of this patent is extended or adjusted under 35 U.S.C. 154(b) by 329 days.

(21) Appl. No.: 18/554,903

(22) PCT Filed: Apr. 19, 2021

(86) PCT No.: PCT/JP2021/015822

§ 371 (c)(1),
(2) Date: Oct. 11, 2023

(87) PCT Pub. No.: WO2022/224295

PCT Pub. Date: Oct. 27, 2022

(65) Prior Publication Data

US 2024/0198665 A1 Jun. 20, 2024

(51) Int. Cl.

*B41J 2/045* (2006.01)
*B41J 2/14* (2006.01)
*G06F 13/40* (2006.01)

(52) U.S. Cl.

CPC ....... *B41J 2/04573* (2013.01); *B41J 2/04581* (2013.01); *B41J 2/14201* (2013.01); *G06F 13/4009* (2013.01); *B41J 2002/14491* (2013.01)

(58) Field of Classification Search

CPC ................ B41J 2/04573; B41J 2/04581; B41J 2/14201; B41J 2002/14491; B41J 2/04541;

(Continued)

(56) References Cited

U.S. PATENT DOCUMENTS 6,169,501 B1 * 1/2001 Ryan ........................ H03M 9/00 341/100
7,940,667 B1 * 5/2011 Coady .................... H04W 56/00 342/72

(Continued)

FOREIGN PATENT DOCUMENTS

JP 6361797 B2 7/2018

OTHER PUBLICATIONS

International Search Report dated Jul. 6, 2021, for the corresponding patent application No. PCT/JP2021/015822, with English translation.

(Continued)

*Primary Examiner* — Thomas J. Cleary
(74) *Attorney, Agent, or Firm* — LUCAS & MERCANTI, LLP

(57) ABSTRACT

A liquid ejection apparatus that includes a driving substrate and a liquid ejection head connected to the driving substrate via a cable. The liquid ejection apparatus includes a converter that converts a signal received via the cable from a serial signal to a parallel signal; a generator that generates a control signal for driving a predetermined driver; a measurer that measures a conversion delay time of the signal at the converter; and an adjuster that adjusts a timing at which the control signal is outputted from the generator, based on the conversion delay time measured by the measurer.

9 Claims, 7 Drawing Sheets

(58) Field of Classification Search
CPC ........ G06F 1/12; G06F 3/1293; G06F 3/1295; G06F 3/1297; G06F 5/10; G06F 13/4009; G06F 13/4282; G11C 2207/107
See application file for complete search history.

(56) References Cited

U.S. PATENT DOCUMENTS

| | | | | |
|---|---|---|---|---|
| 9,042,431 | B1 * | 5/2015 | Yadavalli | H04L 1/243<br>375/221 |
| 10,832,757 | B1 * | 11/2020 | Novellini | G11C 7/222 |
| 2002/0054311 | A1 * | 5/2002 | Kubo | B41J 2/04581<br>358/1.13 |
| 2005/0220089 | A1 * | 10/2005 | Kawashima | H04J 3/0608<br>370/535 |
| 2005/0231399 | A1 * | 10/2005 | Fowler | H03M 9/00<br>341/100 |
| 2007/0071038 | A1 * | 3/2007 | Mao | H04L 1/0025<br>370/516 |
| 2007/0229342 | A1 * | 10/2007 | Baba | H03M 9/00<br>341/156 |
| 2008/0150977 | A1 * | 6/2008 | Harvey | B41J 2/04573<br>347/9 |
| 2014/0267479 | A1 * | 9/2014 | Yamamoto | B41J 2/04581<br>347/10 |
| 2019/0232642 | A1 * | 8/2019 | Kashimura | B41J 2/0455 |
| 2019/0360911 | A1 * | 11/2019 | Loinaz | G01N 15/1459 |

OTHER PUBLICATIONS

International Preliminary Report on Patentability and Written Opinion dated Oct. 24, 2023, for the corresponding patent application No. PCT/JP2021/015822, with English translation.

* cited by examiner

LIQUID EJECTION APPARATUS, RECORDING MEDIUM, AND LIQUID EJECTION HEAD

CROSS REFERENCE TO RELATED APPLICATION

This Application is a 371 of PCT/JP2021/015822 filed on Apr. 19, 2021, which is incorporated herein by reference.

TECHNICAL FIELD

The present invention relates to a liquid ejection apparatus, a program, and a liquid ejection head.

BACKGROUND ART

Conventionally, there is a liquid ejection apparatus in which an image, a structure, and the like are formed on a medium by ejecting ink (liquid) from nozzles. In such a liquid ejection apparatus, appropriate quantities of ink are ejected at desired velocities by applying pressure changes to ink in ink flow paths communicating with the respective nozzles.

As one of the methods of applying pressure to ink, there is a technique of deforming a wall surface of a pressure chamber in an ink flow path by applying a predetermined drive waveform voltage to an actuator such as a piezoelectric device. Since an actuator deforms at a high speed and with high accuracy with respect to the applied voltage, it is possible to precisely control the ejection timing and the ejection amount.

In recent years, the numbers of nozzles and corresponding actuators have been increasing in accordance with demands for higher speed and higher accuracy of a liquid ejection apparatus. Accordingly, the number of drive ICs for selecting an actuator corresponding to a nozzle for ejecting ink also increases. Therefore, the number of control signals of the drive ICs, the number of pins of the connector of the liquid ejection head, and the number of cables increase, so that it becomes difficult to route wiring of a printer. Further, there is also a problem such as a noise malfunction due to crosstalk of a signal.

On the other hand, there is a possibility to reduce the number of the liquid ejection head connectors by performing serial conversion of the control signals and outputting the control signal.

In the invention of Patent Document 1, the control unit converts control signals into a control signal in a serial signal form, and transmits the converted control signal to the head unit. A technique for converting a control signal in a serial signal form into control signals in a parallel signal form in the head unit is described.

CITATION LIST

Patent Literature

Patent Document 1: Japanese Patent No. 6361797

SUMMARY OF INVENTION

Technical Problem

A part of a control signal needs to be input to drive ICs during a constant potential period in which a potential of a drive signal for driving an actuator is constant, but there is a possibility that a delay time is generated according to the serial/parallel conversion of the control signal, and the control signal cannot be input to the drive ICs in the constant potential period of the drive signal.

On the other hand, in the invention of Patent Document 1, the constant potential period of the drive signal is configured to be lengthened so that the control signal can be inputted to head unit in the constant potential period of the drive signal even if the delay time of the control signal changes. In addition, in a case where a head in which a pulse width of the drive signal is large and a constant potential period is short is manufactured and the like, and thus it is demanded that the drive signals should be changed for each head, it is necessary to further lengthen the constant potential time of the drive signal for stable operation.

However, if the constant potential period of the drive signal is longer, there is a problem that the maximum drive frequency becomes smaller for the longer period.

The above-described problem is not only a problem occurring in a signal required for driving an actuator, but also a problem commonly occurring in a signal in which delay times are generated due to serial/parallel conversion between a driving substrate and a liquid ejection head.

It is an object of the present invention to provide a liquid ejection apparatus, a program, and a liquid ejection head that can operate without decreasing the maximum drive frequency even if a delay time is generated when a serial signal transmitted between a driving substrate and a liquid ejection head is converted into a parallel signal.

Solution to Problem

In order to achieve the above object, in the present invention, a liquid ejection apparatus in one embodiment of the invention is a liquid ejection apparatus that includes a driving substrate and a liquid ejection head connected to the driving substrate via a cable, the liquid ejection apparatus including:

conversion means for converting a signal received via the cable from a serial signal to a parallel signal, generation means for generating a control signal for driving predetermined driving means, measurement means for measuring a conversion delay time of the signal at the conversion means, and adjustment means for adjusting a timing at which the control signal is outputted from the generation means, based on the conversion delay time measured by the measurement means.

In one embodiment, the driving substrate includes the generation means, the generation means generates a drive signal for driving the driving means, the liquid ejection head includes the conversion means, and the driving means drives an actuator that causes a plurality of nozzles to eject liquid when the drive signal received via the cable and the control signal subjected to parallel conversion by the conversion means are inputted in the driving means.

In one embodiment, the adjustment means adjusts timings at which the control signal and the drive signal are respectively outputted from the generation means based on the conversion delay time.

In one embodiment, the liquid ejection apparatus further includes a plurality of the liquid ejection heads, wherein the adjustment means determines an adjustment time for adjusting a timing at which the control signal is outputted, based on the largest conversion delay time among the conversion delay times of the plurality of the liquid ejection heads.

n one embodiment, the liquid ejection apparatus further includes a plurality of the liquid ejection heads, wherein the adjustment means determines, for each liquid ejection head, an adjustment time for adjusting a timing at which the control signal is outputted.

In one embodiment, the adjustment means adjusts a timing at which a control signal is outputted among a plurality of the control signals that is inputted to the driving means during a period in which a potential of the drive signal is constant.

In one embodiment, the liquid ejection apparatus further includes conversion control means for controlling the conversion means, wherein when the conversion delay time exceeds a predetermined value, the conversion control means repeats reconnection of communication of the signal at the conversion means until the conversion delay time falls within the predetermined value.

In one embodiment, the measurement means measures the conversion delay time based on a reference signal which is received by the liquid ejection head from the driving substrate and is converted by the conversion means, together with the control signal.

In one embodiment, the liquid ejection head includes a sensor that performs a predetermined measurement, the driving means is controlled according to a reading signal of the sensor.

the driving substrate includes the conversion means, the measurement means measures a conversion delay time of the read signal at the conversion means, and the adjustment means adjusts a timing at which the control signal from the generation means is outputted, based on the conversion delay time of the read signal.

In one embodiment, a program causes a computer in a liquid ejection apparatus that includes a driving substrate: and a liquid ejection head connected to the driving substrate via a cable, the liquid ejection apparatus including:

conversion means for converting a signal received via the cable from a serial signal to a parallel signal, and generation means for generating a control signal for driving a predetermined driving means, to function as:

measurement means for measuring a conversion delay time of the signal at the conversion means, and adjustment means for adjusting a timing at which the control signal is outputted from the generation means, based on the conversion delay time measured by the measurement means.

In one embodiment, a liquid ejection head is connected to the driving substrate via a cable and causes a plurality of nozzles to eject liquid based on a signal for causing each of the plurality of nozzles to eject liquid, the liquid ejection head including:

conversion means for converting a signal received via the cable from a serial signal to a parallel signal, driving means for driving an actuator that causes to eject liquid when the signal subjected to parallel conversion by the conversion means is inputted in the driving means, and signal outputting means for outputting a signal, which is synchronized with the signal converted by the conversion means, to the driving substrate.

Advantageous Effects of Invention

According to the present disclosure, even if a delay occurs when a serial signal transmitted between the driving substrate and the liquid ejection head is converted into a parallel signal, the operation can be performed without decreasing the maximum drive frequency.

DESCRIPTION OF EMBODIMENTS

Hereinafter, an embodiment of the present invention will be described with reference to the drawings.

Figure 1:
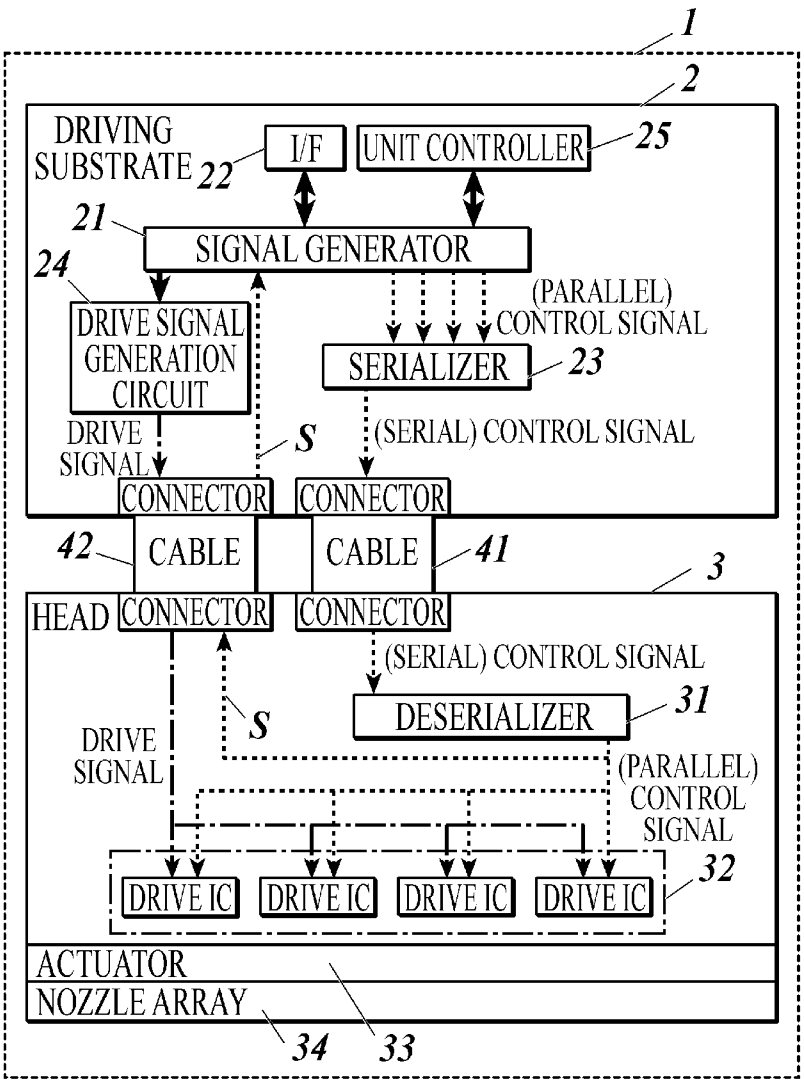
FIG. 1 This is a block diagram showing a functional configuration of a liquid ejection apparatus of an embodiment according to the present invention.

FIG. 1 is a block diagram showing a functional configuration of a liquid ejection apparatus 1.

The liquid ejection apparatus 1 includes a driving substrate 2 and an inkjet head 3 as a liquid ejection head. Here, only one inkjet head 3 is shown, but when the liquid ejection apparatus 1 is a color printer that ejects a plurality of ink colors, inkjet heads respectively corresponding to the plurality of ink colors (for example, four colors of yellow, magenta, cyan, and black) 3 are provided. Further, a plurality of inkjet heads 3 that ejects the same color may be provided to further increase the number of nozzles. The driving substrate 2 and the inkjet head 3 are connected to each other by cables 41 and 42. For example, a coaxial cable or an STP (Shielded Twisted Pair) is used as the cables 41 and 42.

The driving substrate 2 includes a signal generator 21, an input/output interface 22 (I/F), a serializer 23, a drive signal generation circuit 24, a unit controller 25, a memory (not shown), and the like.

The signal generator 21 performs arithmetic processing on the basis of an instruction related to image recording from an external device received by the input/output interface 22, settings, and image data to be recorded, and performs various control processing related to the image recording operation in the liquid ejection apparatus 1.

Specifically, the signal generator 21 generates a control signal and a drive data signal in a digital form for causing a plurality of nozzles of the inkjet head 3 to eject respective ink.

The signal generator 21 outputs the generated control signals and drive data signal in a parallel signal form.

The control signal includes pixel data, which will be described later, and a signal for controlling operation permission and operation timing about transfer of pixel data, supply of a drive signal and the like.

As the signal generator 21, for example, an FPGA (Field Programmable Gate Array) is used.

The input/output interface 22 is an interface for receiving an instruction for image recording, settings, and image data to be recorded from an external device, and for outputting a status of an image recording operation, abnormality occurrence information, and the like from the signal generator 21 to the external device. As the input/output interface 22, a network card (LAN card) or the like is used.

The serializer 23 performs serial conversion on various control signals in a form of a parallel signal outputted from the signal generator 21.

The control signals subjected to the serial conversion are outputted to the deserializer 31 in inkjet head 3 via a cable 41 connecting the driving substrate 2 and the inkjet head 3.

The drive signal generation circuit 24 converts the drive data signal in a digital form outputted from the signal generator 21 into the drive data signal in an analog form, and then amplifies it to generate a drive signal.

The generated drive signal is outputted to drive ICs 32 in the inkjet head 3 via a cable 42 and is used to drive an actuator 33 in the inkjet head 3.

Therefore, the signal generator 21 and the drive signal generation circuit 24 function as the generation means (generator).

The unit controller 25 performs overall control of the entire operation of the liquid ejection apparatus 1.

The memory (not shown) stores image data to be recorded that is acquired from an external device and pixel data for determining status of ink ejection from the respective nozzle that is generated from the image data.

The pixel data is output from the memory (not shown) and then input to the signal generator 21, and is output from the signal generator 21 in a parallel signal form together with other control signals. Then, the pixel data is subjected to serial conversion in the serializer 23 together with the other control signals.

The inkjet head 3 includes a deserializer 31, the drive ICs 32, actuators 33, a nozzle array 34, and the like.

The deserializer 31 converts the control signal in a serial signal form outputted from the serializer 23 into the control signals in a parallel signal form. Here, the deserializer 31 functions as the conversion means (converter)

The control signals subjected to parallel conversion are outputted to the drive ICs 32. The pixel data subjected to parallel conversion, of the control signal is outputted to the drive ICs 32 of the inkjet head 3, and is used to select a nozzle to be ejected.

The drive ICs 32 receive the drive signals outputted from the drive signal generator 24 and the control signals outputted from the deserializer 31.

Based on the control signal, the drive IC 32 outputs a drive signal for deforming the actuator 33 at an appropriate timing, amplitude, and duration to the actuator 33 corresponding to the selected nozzle.

Thus, the drive IC 32 functions as the driving means (driver).

The actuators 33 apply a change in pressure to the ink to eject the ink for each channel (ink flow path) that communicates with each nozzle and supply the ink, or to vibrate the liquid level (meniscus) without ejecting the ink. As the actuator 33, a piezoelectric element such as PZT (lead zirconate titanate) is used here, and the piezoelectric element is disposed between the channels as a partition wall of a channel arranged in one dimensional manner. When a predetermined voltage is applied to the actuator through an electrode film provided on both side surfaces of the actuator (i.e., the inner surface of the channel), actuator is bent and deformed to apply pressure to the ink inside. A dummy channel for giving influence of bending deformation to both ends of the channels arranged in one dimensional manner is provided at both ends of the channels, and the deformation operation is performed without supplying and discharging ink. Here, a shear mode is used for the deformation of the actuator, but a deformation in another mode such as a bend mode may be used.

The nozzle array 34 has two or more predetermined numbers of nozzles arranged to form an appropriate configuration.

The actuator 33 and the nozzle array 34 are each configured as one block, but may be divided into a plurality of blocks.

Figure 2A:
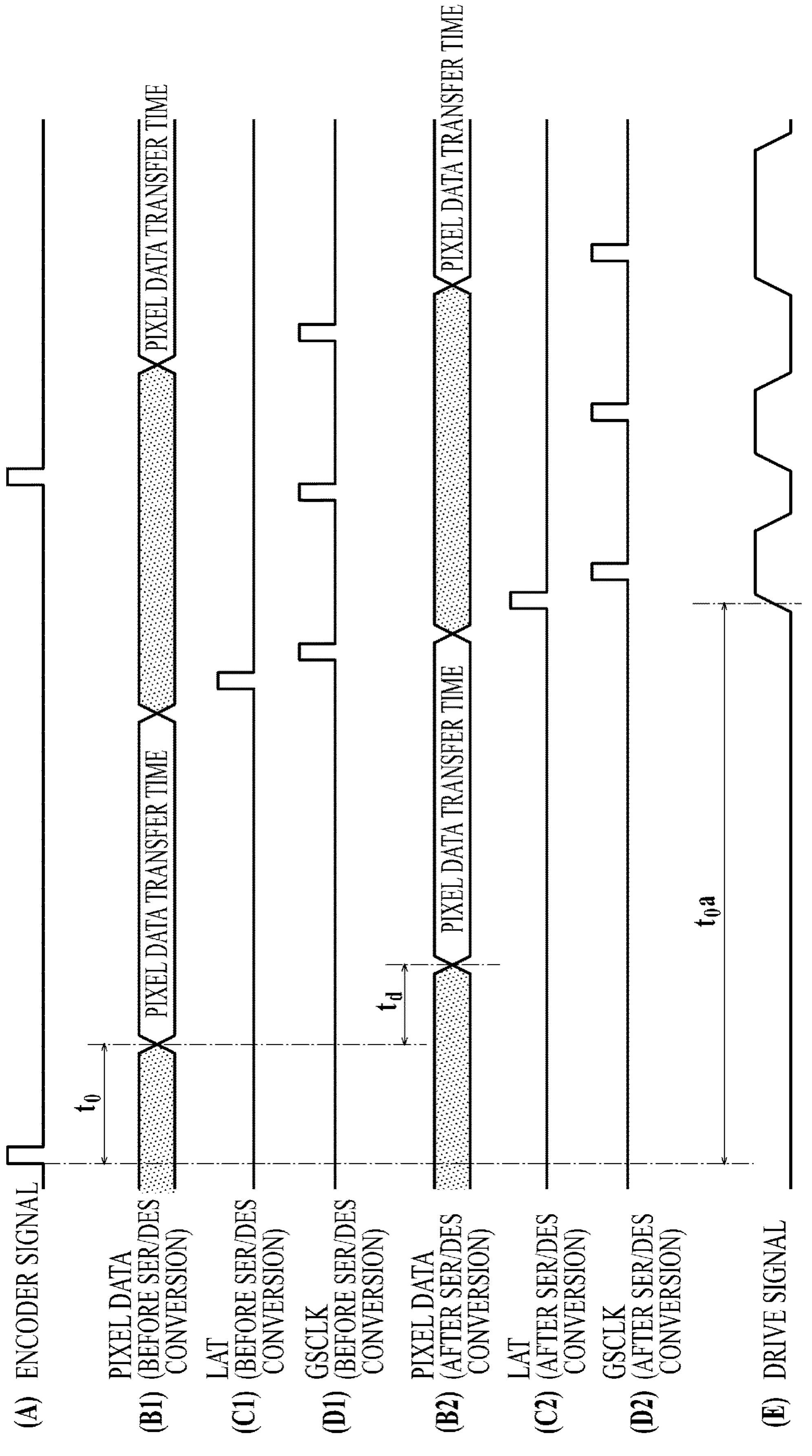
FIG. 2A This is a diagram showing a delay of a control signal of an embodiment according to the present invention.

FIG. 2A is a diagram showing a delay generated when the control signal is converted by the serializer 23 and the deserializer 31.

(A) in FIG. 2A is an encoder signal which is a conveyance position detecting signal of a conveyance belt (not shown) on which a recording medium discharged by the inkjet head 3 is placed. The encoder signal is inputted from an external device to the signal generator 21 via the input/output interface 22. The signal generator 21 controls timings at which various signals are outputted based on the encoder signals.

A pixel data (B1) in FIG. 2A, a LAT signal (C1) in FIG. 2A, and a GSCLK signal (D1) in FIG. 2A are parts of the control signal that is output with a set period ($t_0$) for setting a timing of outputting from the signal generator 21 based on the encoder signal. These are signals before the serial/parallel conversion (Ser/Des conversion) by the serializer 23 and the deserializer 31. The LAT signal is an updated signal of the pixel data, and the GSCLK signal is a signal used to control the gradation. The LAT signal and the GSCLK signal have a constraint on a timing that they must be inputted to the drive IC in a constant potential period in which a potential of a drive signal (E) in FIG. 2A to be described later is kept constant.

A pixel data (B2) in FIG. 2A, a LAT signal (C2) in FIG. 2A, and a GSCLK signal (D2) in FIG. 2A are signals inputted to the drive IC 32 after the serial/parallel conversion. Here, the serial/parallel conversion generates a conversion delay time ($t_d$).

The drive signal (E) shown in FIG. 2A is an exemplary drive signal inputted to the drive IC 32. The drive signal is provided with a set period ($t_0a$) for setting the timing of outputting from the drive signal generation circuit 24 based on the encoder signal.

When a delay occurs due to the serial/parallel conversion of the control signal as shown in FIG. 2A, the LAT signal (C2) and the GSCLK signal (D2) are inputted to the drive IC 32 outside the constant potential of the driving signal (E), and there is a case where the constraint on the timing cannot be satisfied.

Figure 2B:
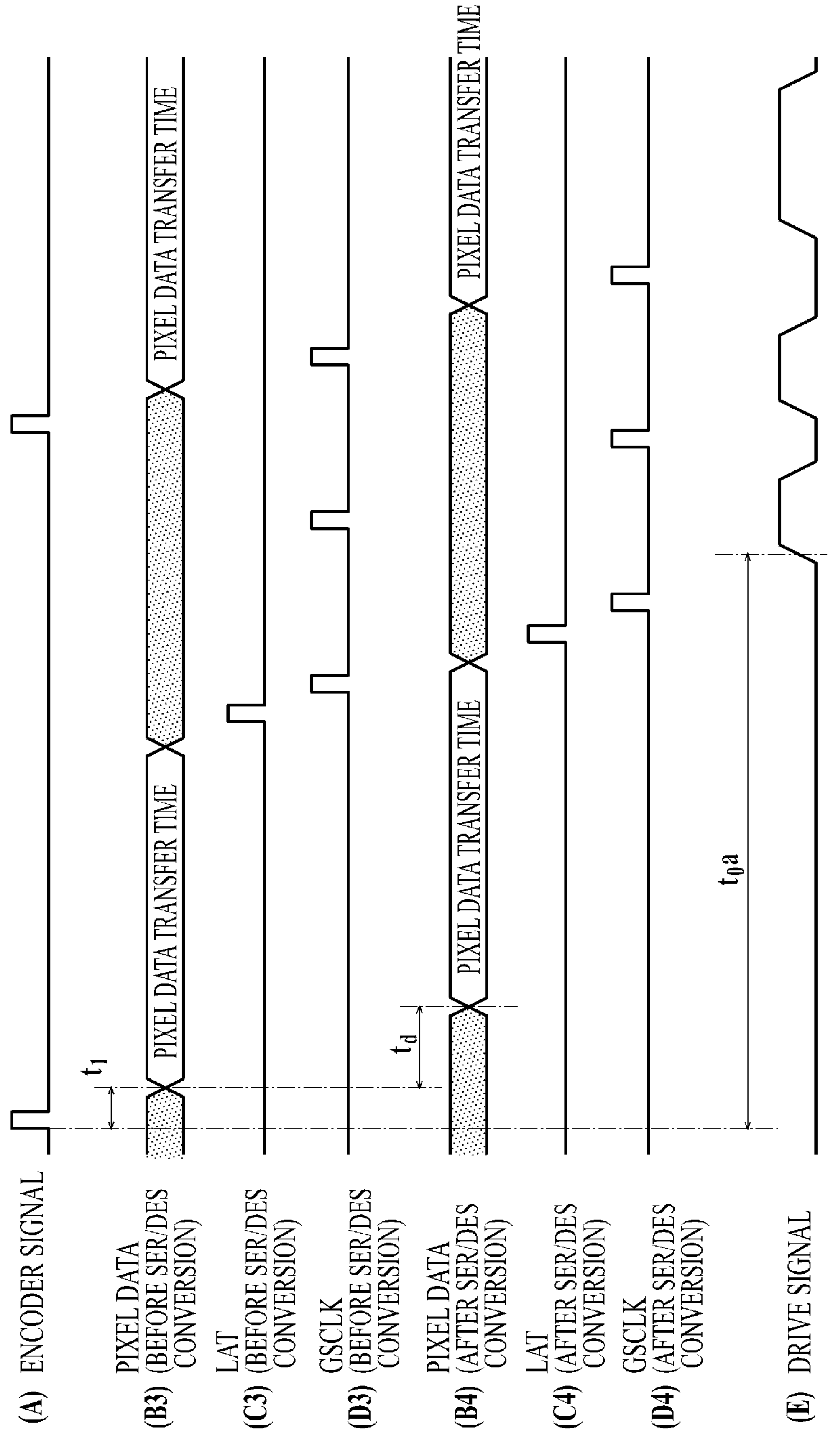
FIG. 2B This is a diagram showing a control signal of which a delay is adjusted in an embodiment of the present invention.

An example of adjusting the timing of outputting from the signal generator 21 in order to enter the LAT signal and the GSCLK signal to the drive IC 32 in the constant potential of the driving signal is shown in FIG. 2B.

An encoder signal (A) in FIG. 2B is the same signal as the encoder signal in FIG. 2A, and a drive signal (E) in FIG. 2B is the same as the drive signal in FIG. 2A.

A pixel data (B3) in FIG. 2B, a LAT signal (C3) in FIG. 2B, and a GSCLK signal (D3) in FIG. 2B are provided with an adjusted time ($t_1$) which is calculated by subtracting the conversion delay time ($t_d$) from the set time ($t_0$), and outputted. These are signals before serial/parallel conversion by the serializer 23 and the deserializer 31.

The pixel data (B4) in FIG. 2B, the LAT signal (C4) in FIG. 2B, and the GSCLK signal (D4) in FIG. 2B are signals inputted to the drive IC 32 after the serial/parallel conversion. The serial/parallel conversion generates a conversion delay time ($t_d$).

Even when a delay occurs due to the serial/parallel conversion of the control signal, the control signal and the driving signal are input to the drive IC 32 at appropriate timings since the LAT signal (C4) in FIG. 2B and the GSCLK signal (D4) in FIG. 2B are provided with the adjusting time ($t_1$) to be inputted to the drive IC 32 during the constant potential of the driving signal (E), as shown in FIG. 2B.

The conversion delay times ($t_d$) of the control signals generated due to the conversion in the serializer 23 and the deserializer 31 varies depending on individual differences between the serializer 23 and the deserializer 31, the length of the cable 41, the use environment, and the like.

Therefore, in order to provide an appropriate adjusting time ($t_1$), a part of the control signal outputted from the deserializer 31 as shown in FIG. 1 is inputted as a signal S to the signal generator 21 of the driving substrate 2 via the cable 42. The signal S may be any one of the control signals. Here, the circuit from the deserializer 31 to a connector on the inkjet head 3 to which the cable 42 is connected functions as the signal outputting means (signal outputter).

The signal generator 21 measures a conversion delay from the received signal S. The signal generator 21 determines an adjustment time of the control signals based on the conversion delay time, and provides the adjustment time with the control signals to output the control signal to the serializer 23. Here, the signal generator 21 functions as the measurement means (measurer) and the adjustment means (adjuster).

The control signals provided with the adjusting time is converted by the serializer 23 and the deserializer 31, and is inputted to the drive ICs 32 together with the drive signal. In this case, the LAT signal and the GSCLK signal are inputted to the drive ICs 32 during the constant potential of the drive signal.

As described above, by compensating for the conversion delay time in the control signal in a serial signal form transmitted from the driving substrate 2 to the inkjet head 3 so as to satisfy the constraint of the timing between the control signal and the drive signal, a memory or a controller for compensating for the conversion delay time is not required in the inkjet head 3, and the conversion delay time can be compensated with a simple configuration. In addition, since the inkjet head 3 does not have a memory or a controller, the inkjet head 3, which is a consumable, can be priced down.

In addition, inkjet head can be driven at the maximum drive frequency regardless of the number of the inkjet heads installed in the liquid ejection apparatus 1 since a longer period of the constant potential of the drive signal is not required.

Furthermore, it is possible for a drive signal having multi-waveforms in which a period of a constant potential between the waveforms is short such as several hundred nsec, to satisfy the constraint of the timing of a signal such as a GSCLK signal having the constraint of the timing.

The timing for determining the adjusting time for the control signal is obtained when a power of the liquid ejection apparatus 1 is turned on. Alternatively, it may be obtained periodically.

In addition, for example, when the conversion delay time cannot be compensated only by providing the adjustment time in the control signal, that is, when the conversion delay time ($t_d$) in FIG. 2A is longer than the set time ($t_0$), the signal generator 21 may provide another adjustment time in the drive signal in addition to providing the adjustment time in the control signal. The adjustment time provided in the drive signal is set so as not to cause a timing violation between the control signal and the drive signal. The driving substrate 2 can set the discharge timing of the inkjet head 3 by setting another adjusting time. Therefore, the deviation of the ink landing position can be corrected.

The control signal for providing the adjustment time may be one or more of a plurality of the control signals. In the signal generator 21, the configuration of the driving substrate 2 is simplified by providing the adjusting times only for the signals with strict timing constraints.

The signal with the strict timing constraint is, for example, a LAT signal or a GSCLK signal, and these signals need to be inputted to the drive IC 32 during the constant potential of the drive signal. Therefore, only in these signals, the conversion delay time may be compensated by providing an adjustment time when a timing violation occurs. This simplifies the configuration of the driving substrate 2.

Also, the conversion delay time may change each time a signal communication is established in the serializer 23 and the deserializer 31. Therefore, when the conversion delay time exceeds the predetermined value, the signal generator 21 repeatedly reconnects the communication in the serializer 23 and the deserializer 31 until the conversion delay time falls within the predetermined value. Here, the signal generator 21 functions as the conversion control means (conversion controller). The case where the conversion delay time exceeds the predetermined value is, for example, a case where the conversion delay time cannot be compensated only by providing an adjustment time in the control signal, that is, a case where the conversion delay time ($t_d$) in FIG. 2A is longer than the set time ($t_0$) or a case where timing violation to the drive signal occurs. The reconnection of the communication in the serializer 23 and the deserializer 31 is performed by resetting the communication in the serializer 23 and the deserializer 31 or by stopping supply of a clock signal for use in the communication.

Modification 1

Next, Modification 1 of the present invention will be described. In Modification 1, the same components as those of the above-described embodiment are denoted by the same reference numerals, and description thereof will be omitted.

Figure 3:
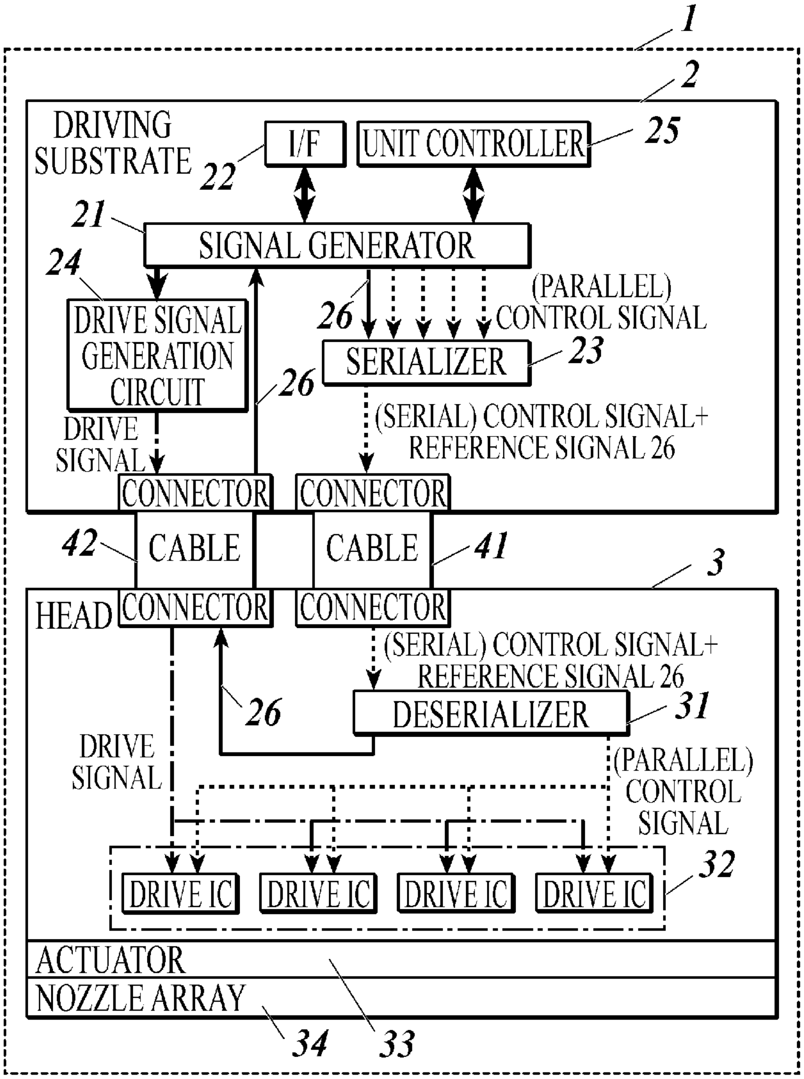
FIG. 3 This is a block diagram showing a functional configuration of a liquid ejection apparatus according to a first modification of the embodiment of the present invention.

In the above embodiment, the signal S, which is a part of the control signal, is inputted to the signal generator 21 in order to provide appropriate adjusting times, but the present invention is not limited thereto. In order to measure the conversion delay time, a reference signal 26 shown in FIG. 3 which is different from the control signal may be used.

The reference signal 26 is outputted from the signal generator 21 in a parallel signal form together with control signals, and inputted to the serializer 23. Then, the reference signal 26 is subjected to serial conversion together with the control signals in the serializer 23, and inputted to the deserializer 31 via the cable 41. Then, the reference signal 26 is subjected to parallel conversion together with the control signal, and outputted in the deserializer 31. The reference signal 26 outputted from the deserializer 31 is inputted to the signal generator 21 via the cable 42. Here, the circuit from the deserializer 31 to the connector on the inkjet head 3 to which the cable 42 is connected functions as the signal outputting means.

Therefore, the reference signal 26 is delayed due to the conversion by the serializer 23 and the deserializer 31 in the same manner as the control signal. The conversion delay time of the control signal is equal to the conversion delay time of the reference signal 26.

Modification 2

Next. Modification 2 of the present invention will be described. In Modification 2, the same components as those of the above-described embodiment are denoted by the same reference numerals, and description thereof will be omitted.

In the present modification, the liquid ejection apparatus 1 includes a plurality of the inkjet heads 3.

Figure 4:
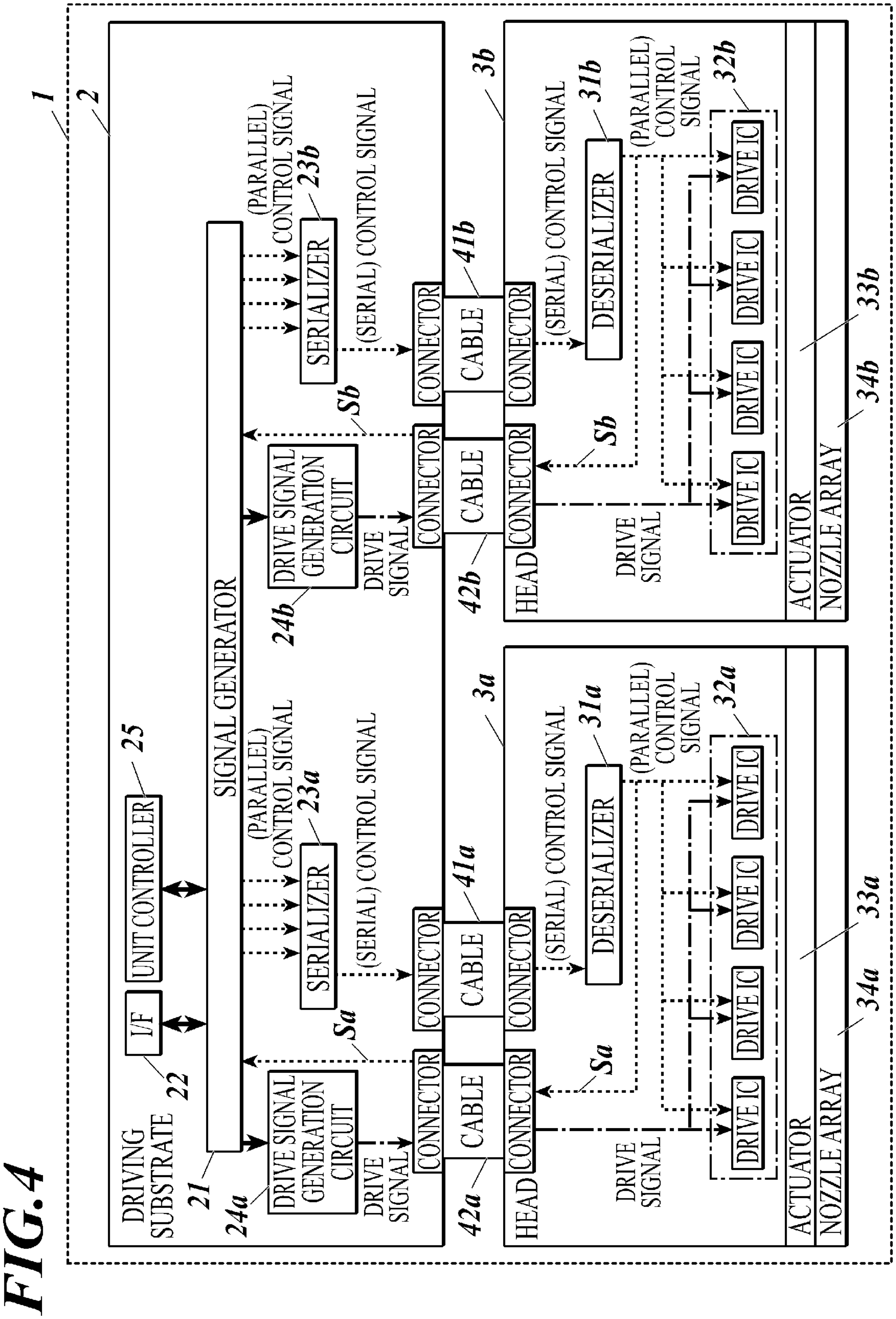
FIG. 4 This is a block diagram showing a functional configuration of a liquid ejection apparatus according to a second modification of the embodiment of the present invention.

FIG. 4 is a diagram showing a functional configuration of the liquid ejection apparatus 1 including a plurality of the inkjet heads 3. In the embodiment shown in FIG. 4, the number of the inkjet heads 3 is two, that is, the inkjet head 3*a* and the inkjet head 3*b*. The driving substrate 2 and the inkjet head 3*a* are connected to each other by a cable 41*a* and a cable 42*a*. The driving substrate 2 and the inkjet head 3*b* are connected to each other by a cable 41*b* and a cable 42*b*. The driving substrate 2 includes serializers 23*a* and 23*b*, and drive signal generation circuits 24*a* and 24*b*. Other configurations are the same as those of the single the inkjet head 3 shown in FIG. 1.

In the exemplary embodiment shown in FIG. 4, for the inkjet head 3*a*, a signal Sa that is a part of the control signal is inputted to the signal generator 21, and for the inkjet head 3*b*, a signal Sb that is a part of the control signal is input to the signal generator 21, in order to provide appropriate adjustment times.

In the present modification, the two inkjet heads 3 are provided as the plurality of inkjet heads 3 included in the liquid ejection apparatus 1, but the present invention is not limited thereto. The configuration may include three or more inkjet heads 3.

When the liquid ejection apparatus 1 includes a plurality of inkjet heads 3, adjusting times may be determined in the plurality of inkjet heads 3, respectively. In other words, with respect to the inkjet head 3*a*, the signal generator 21 measures a conversion delay time associated with the inkjet head 3*a* from the inputted Sa. The signal generator 21 determines an adjustment time of the control signal to be outputted to the inkjet head 3*a* based on the conversion delay time according to the inkjet head 3*a*. Similarly, with respect to the inkjet head 3*b*, the signal generator 21 measures a conversion delay time associated with the inkjet head 3*b* from the inputted Sb. The signal generator 21 determines an adjustment time of the control signal to be outputted to the inkjet head 3*b* based on the conversion delay time according to the inkjet head 3*b*.

This enables optimization of the adjustment time for each inkjet head 3, so the inkjet head 3 can be driven with the maximum drive frequency regardless of the number of the inkjet heads 3 installed.

In addition, when the liquid ejection apparatus 1 includes a plurality of the inkjet heads 3, the conversion delay times in the plurality of the inkjet heads 3 may be measured respectively, and then the adjusting time may be determined based on the largest conversion delay time. That is, the signal generator 21 compares the conversion delay time based on the inputted signal Sa shown in FIG. 4 with the conversion delay time based on the signal Sb, and determines the adjusting time based on the larger conversion delay time. This makes it possible to simplify the configuration of the driving substrate 2.

In addition, when the liquid ejection apparatus 1 includes a plurality of the inkjet heads 3, only for the inkjet head 3 in which a measured conversion delay time exceeds a predetermined value among measured conversion delay times for the plurality of the inkjet heads 3, the conversion delay time may be compensated by providing the adjusting time. This simplifies the configuration of the driving substrate 2. The specified value may be any value that does not cause violation of a timing between the control signal and the drive signal. The predetermined value may be a set time for setting a timing outputted from the signal generator 21 based on the encoder signal.

Modification 3

Next. Modification 3 of the present invention will be described. In Modification 3, the same components as those of the above-described embodiment are denoted by the same reference numerals, and description thereof will be omitted.

Figure 5:
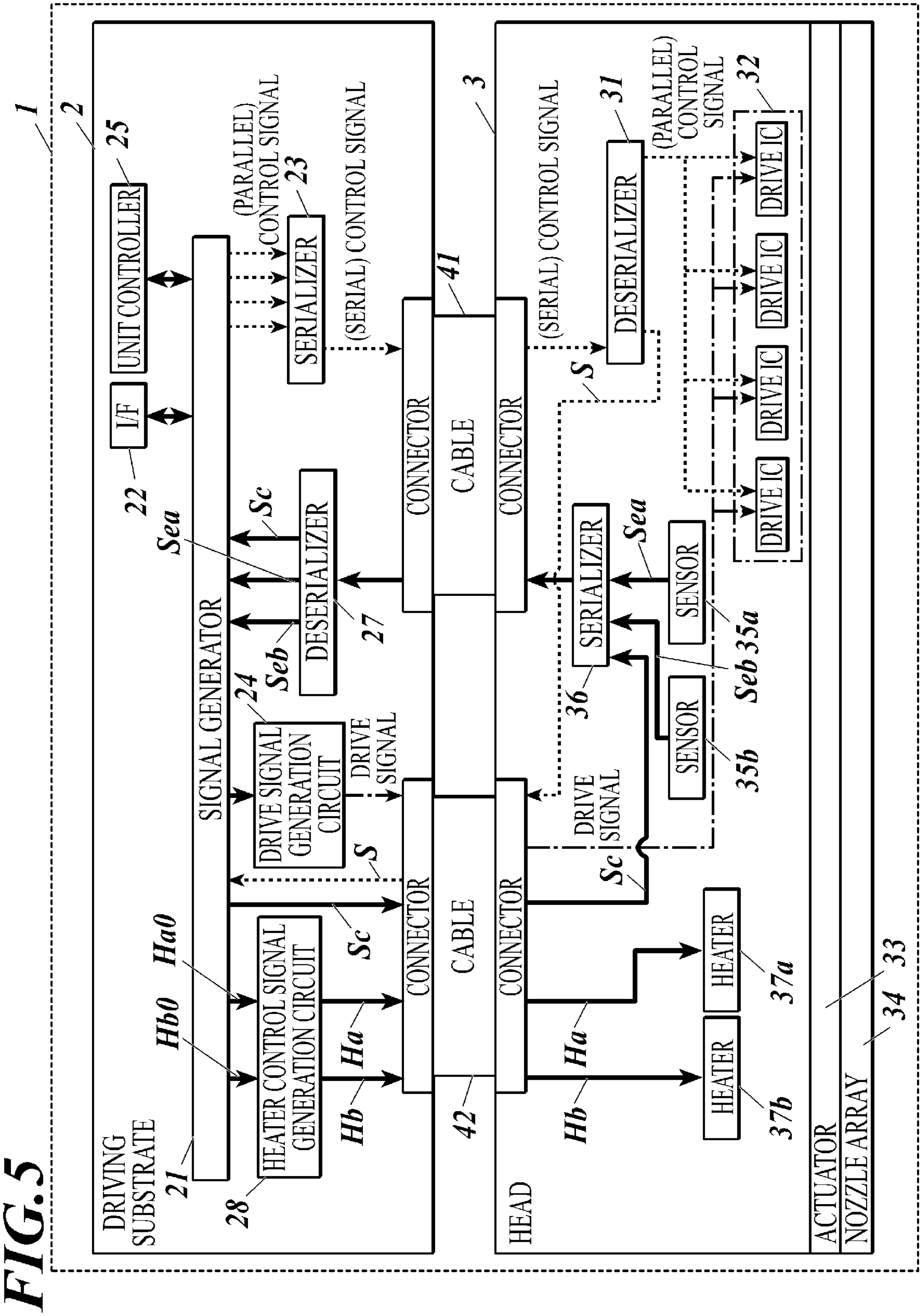
FIG. 5 This is a block diagram showing a functional configuration of a liquid ejection apparatus according to a third modification of the embodiment of the present invention.

FIG. 5 is a diagram showing a functional configuration of the liquid ejection apparatus 1 according to the present modification.

In the present modification, as shown in FIG. 5, the driving substrate 2 includes a deserializer 27 as the conversion means and a heater control signal generation circuit 28 as the generation means. The inkjet head 3 includes thermal sensors 35*a* and 35*b* as the sensor, a serializer 36, and heaters 37*a* and 37*b* as the driving means.

Further, in the present modification, in addition to the control signal (a LAT signal, a GSCLK signal, and the like) and the drive signal, the converter delay time is compensated between the temperature sensor 35*a* and the heater 37*a* provided in the inkjet head 3, and between the temperature sensor 35*b* and the heater 37*b* provided in the inkjet head 3. The signal generator 21 controls the heater 37*a* based on a read signal Sea outputted from the temperature sensor 35*a*, and controls the heater 37*b* based on a read signal Seb outputted from the temperature sensor 35*b*. Specifically, the signal generator 21 as the adjustment means outputs the respective heater control data Ha0 and Hb0 based on the read signals Sea and Seb to the heater control signal generation circuit 28. Then, in the heater control signal generation circuit 28, heater control signals Ha and Hb are generated from the heater control data Ha0 and Hb0, and are inputted to the heater 37*a* and 37*b* via the cable 42.

Further, in the present modification, the read signal Sea outputted from the temperature sensor 35*a* and the read signal Seb outputted from the temperature sensor 35*b* are inputted to the serializer 36 and subjected to serial conversion. After that, they are inputted to the deserializer 27 via the cable 41, are subjected to parallel conversion, and are inputted to the signal generator 21. Therefore, in the read signals Sea and Seb, conversion delay times are generated due to the conversions in the serializer 36 and the deserializer 27.

A reference signal Sc as shown in FIG. 5 is used to measure conversion delay times occurring in the read signals Sea and Seb.

The reference signal Sc is outputted from the signal generator 21 and inputted to the serializer 36 via the cable 42. Then, the reference signal Sc is subjected to serial conversion together with the read signals Sea and Seb in the serializer 36 and outputted. The reference signal Sc outputted from the serializer 36 is inputted to the deserializer 27 via the cable 41. The reference Sc is then subjected to parallel conversion in the deserializer 27 and inputted to the signal generator 21.

Therefore, in the reference signal Sc, a conversion delay time is generated due to the conversions in the serializer 36 and the deserializer 27 in the same way as the read signals Sea and Seb. The conversion delay times of the read signals Sea and Seb are equal to the conversion delay time of the reference signal Sc.

The signal generator 21 as the measurement means measures the conversion delay times of the read signals Sea and Seb from the inputted reference signal Sc. The signal generator 21 adjusts a timing of outputting the heater control data Ha0 and Hb0 to the heater control signal generator 28 based on the converted delay time of the read signals Sea and Seb.

In the above, the converter delay times are compensated between the temperature sensor 35*a* and the heater 37*a* and between the temperature sensor 35*b* and the heater 37*b*, but the present invention is not limited thereto. Conversion delay times may be compensated between a predetermined sensor (for example, an optical sensor or an accelerating sensor) provided in the inkjet head 3 and a motor of the liquid ejection apparatus 1.

Modification 4

Next. Modification 4 of the present invention will be described. In Modification 4, the same components as those of the above-described embodiment are denoted by the same reference numerals, and description thereof will be omitted.

Figure 6:
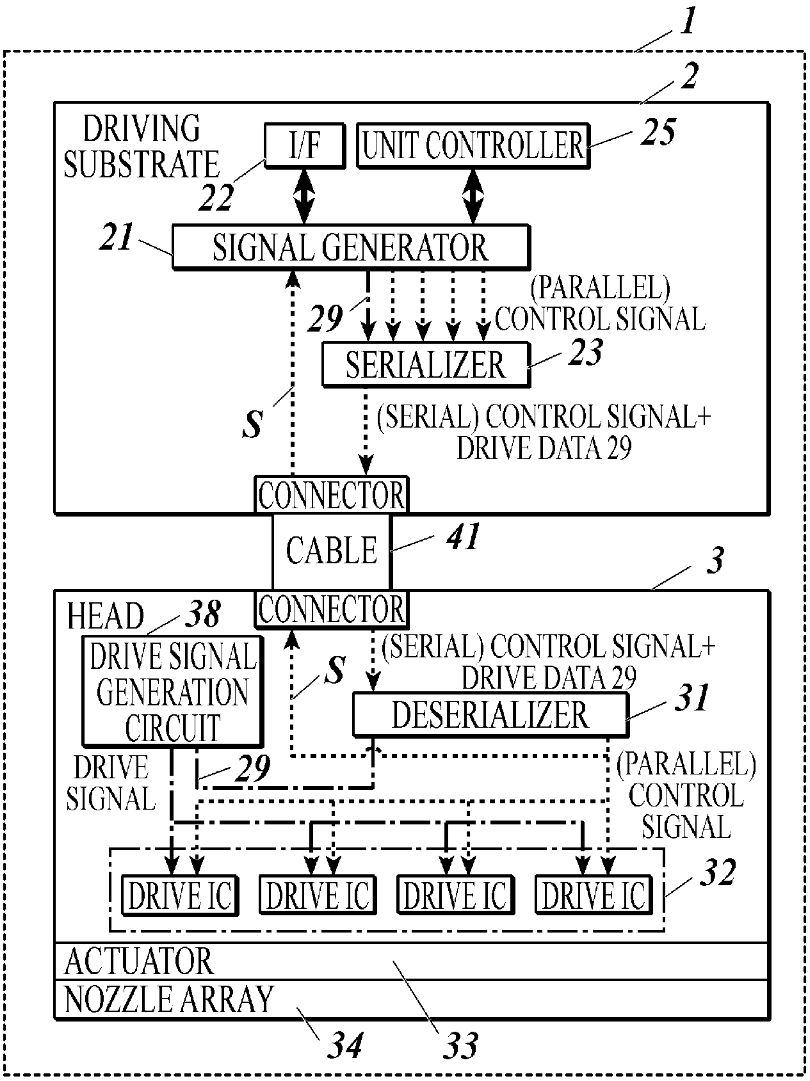
FIG. 6 This is a block diagram showing a functional configuration of a liquid ejection apparatus according to a fourth modification of the embodiment of the present invention.

In the configuration of the present modification, as shown in FIG. 6, the driving substrate 2 does not include the drive signal generation circuit 24, and the inkjet head 3 includes the drive signal generation circuit 38.

In the present modification, the signal generator 21 generates control signals in a digital form and drive data 29 for generating a drive signal based on a command related to image recording from an external device which is received by the input/output interface 22, a setting, and image data to be recorded.

Next, the control signals and the drive data 29 are outputted from the signal generator 21 in a parallel signal form and inputted to the serializer 23. Then, in the serializer 23, the control signals and the drive data 29 are subjected to serial conversion and input to the deserializer 31 via the cable 41. Next, the control signal and the drive data 29 are subjected to parallel conversion and outputted in the deserializer 31. The control signals outputted from the deserializer 31 is inputted to the drive ICs 32. A part of the control signals outputted from the deserializer 31 is inputted as a signal S to the signal generator 21 of the driving substrate 2 via the cable 41. The drive data 29 outputted from the deserializer 31 is inputted to the drive signal generation circuit 38.

The drive signal generation circuit 38 amplifies the drive data 29 output from the deserializer 31 as it is in a digital signal form or after converting the drive data 29 in a digital signal form to the drive data 29 in an analog, to generate a drive signal. The generated drive signal is outputted to the drive ICs 32 in the inkjet head 3 and used to drive the actuator 33 in the inkjet head 3.

In the present modification, since the drive data 29 is also subjected to serial/parallel conversion in addition to the control signal, a conversion delay time accompanying the serial/parallel conversion also occurs in the drive data 29. Therefore, adjustment time is also provided for the drive data 29 in the same way as the control signal. In other words, the signal generator 21 measures the conversion delay time from the inputted signal S. Then, the signal generator 21 determines each adjustment time by subtracting the conversion delay time from each set time of the control signal and the drive data 29, and outputs the control signals and the drive data 29, each of which is provided with each adjustment time, to the serializer 23. Thus, even if the delay time varies every time communication is performed, it is possible to correct deviation of landing positions of ink.

When the conversion delay time exceeds a predetermined value, the communication reconnection in the serializer 23 and the deserializer 31 is repeated until the conversion delay time falls within the predetermined value. Here, the signal generator 21 functions as the conversion control means. If the predetermined value is 100 nsec, for example, the deviation of the ejection positions can be suppressed to 1% or less even during high-speed printing. The case where the conversion delay time exceeds the predetermined value is a case where the conversion delay time cannot be compensated only by providing the adjustment time in the control signal, that is, a case where the conversion delay time ($t_d$) in FIG. 2A is longer than the set time ($t_0$).

As described above, the liquid ejection apparatus 1 according to the present embodiment is a liquid ejection apparatus that includes a driving substrate 2 and a liquid ejection head (inkjet head 3) connected to the driving substrate via cables 41 and 42, the liquid ejection apparatus 1 including: conversion means (deserializer 31 and deserializer 27) for converting a signal received via the cables 41 and 42 from a serial signal to a parallel signal, generation means (signal generator 21 and drive signal generator 24) for generating a control signal for driving predetermined driving means (IC 32 and heater 37*a* and 37*b*), measurement means (signal generator 21) for measuring a conversion delay time of the signal at the conversion means, and adjustment means (signal generator 21) for adjusting a timing at which the control signal is outputted from the generation means, based on the conversion delay time measured by the measurement means.

Accordingly, it is possible to provide a liquid ejection apparatus, a program, and a liquid ejection head that can operate without reducing the maximum drive frequency even if a delay time occurs when a serial signal transmitted between the driving substrate and the liquid ejection head is converted into a parallel signal.

Further, in the liquid ejection apparatus 1 according to the present embodiment, the driving substrate 2 includes the generation means, the generation means generates a drive signal for driving the driving means (drive IC 32), the liquid ejection head includes the conversion means, and the driving means drives an actuator 33 that causes a plurality of nozzles to eject liquid when the drive signal received via the cables 41 and 42 and the control signals subjected to parallel conversion by the conversion means are inputted in the driving means.

Accordingly, it is possible to provide a liquid ejection apparatus, a program, and a liquid ejection head that eject a liquid without decreasing the maximum drive frequency even if a delay time occurs in the control signal in a serial signal form transmitted from the driving substrate to the inkjet head.

Further, in the liquid ejection apparatus 1 according to the present embodiment, the adjustment means adjusts timings at which the control signal and the drive signal are respectively outputted from the generation means based on the conversion delay time.

Accordingly, it is possible to correct deviation of ink landing positions since it is possible to set the ejection timing of the inkjet head 3 on the side of the driving substrate 2.

Further, the liquid ejection apparatus 1 according to the present embodiment includes a plurality of the liquid ejection heads, wherein the adjustment means determines an adjustment time for adjusting a timing at which the control signal is outputted, based on the largest conversion delay time among the conversion delay times of the plurality of the liquid ejection heads.

This makes it possible to simplify the configuration of the driving substrate 2.

Further, the liquid ejection apparatus 1 according to the present embodiment includes a plurality of the liquid ejection heads, wherein the adjustment means determines, for each liquid ejection head, an adjustment time for adjusting a timing at which the control signal is outputted.

Accordingly, it is possible to drive the inkjet heads 3 with the maximum drive frequency regardless of the number of the inkjet heads 3 installed since it is possible to optimize the adjustment time for each of the inkjet heads 3.

Further, in the liquid ejection apparatus 1 according to the present embodiment, the adjustment means adjusts a timing at which a control signal among a plurality of the control signals that is inputted to the driving means (drive IC 32) during a period in which a potential of the drive signal is constant, is outputted.

This makes the configuration of the driving substrate 2 simpler than when adjusting the timings of outputting of all the control signals.

Further, the liquid ejection apparatus 1 according to the present embodiment includes conversion control means for controlling the conversion means, wherein when the conversion delay time exceeds a predetermined value, the conversion control means repeats reconnection of communication of the signal at the conversion means until the conversion delay time falls within the predetermined value.

Accordingly, it is possible to compensate the conversion delay time even when the conversion delay time exceeds a predetermined value.

Further, in the liquid ejection apparatus 1 according to the present embodiment, the measurement means measures the conversion delay time based on a reference signal which is received by the liquid ejection head from the driving substrate 2 and is converted by the conversion means, together with the control signals.

Accordingly, it is unnecessary to provide a memory or a controller for compensating for the conversion delay time within the inkjet head 3, and thus it is possible to compensate the conversion delay time with a simple configuration based on the reference signal 26.

Further, in the liquid ejection apparatus 1 according to the present embodiment, the liquid ejection head includes sensors (temperature sensors 35*a* and 35*b*) that perform a predetermined measurement, the driving means (heaters 37*a* and 37*b*) are controlled according to reading signals of the sensors, the driving substrate includes the conversion means (deserializer 27), the measurement means measures conversion delay times of the read signals at the conversion means, and the adjustment means adjusts timings at which the control signals (heater control signals Ha and Hb) from the generation means are outputted, based on the conversion delay times of the read signals.

This makes it possible to compensate for conversion delay times for signals other than the control signals for ejecting ink from each of the plurality of nozzles of the inkjet head 3.

The present invention is not limited to the above-described embodiments, and various modifications can be made.

For example, in the embodiment and the modifications described above, the signal generator 21 determines the adjusting time based on the conversion delay time, but the present invention is not limited thereto. An external device such as a computer connected via the input/output interface 22 may determine the adjustment time. In this case, information about the conversion delay time is outputted to the external device via the signal generator 21 and the input/output interface 22 to be used for determining the adjusting time. Therefore, the external device is also included in the liquid ejection apparatus 1.

In the embodiment and the modifications described above, the signal generator 21 performs arithmetic processing, performs various control processing related to the image-recording operation in the liquid ejection apparatus 1, and determines the adjusting time based on the converting delay time, but the present invention is not limited thereto. A CPU (Central Processing Unit) is provided along with an FPGA as the signal generator 21, and the FPGA and the CPU may perform arithmetic processing, perform various control processing related to the image recording operation in the liquid ejection apparatus 1, and determine the adjusting time based on the conversion delay time.

Further, the CPU may be configured to function as the adjustment means by executing a program.

In the embodiment and the modifications described above, the signal S and the reference signal 26 outputted from the deserializer 31 are inputted to the signal generator 21 via the cable 42, but the present invention is not limited thereto. The signal S and the reference signal 26 outputted from the deserializer 31 may be inputted to the signal generator 21 via the cable 41.

In addition, the signal S and the reference signal 26 may be transmitted by a differential signal in order to suppress influence of noise. The cables 41 and 42 may be either UTP (Unshielded Twisted Pair) cables or FPC (Flexible Printed Circuits).

In addition, specific details of the configuration, circuit arrangement, operation procedure, and the like described in the above embodiment can be appropriately changed without departing from the spirit of the present invention.

INDUSTRIAL APPLICABILITY

The present disclosure is applicable to a liquid ejection apparatus, a program for controlling a liquid ejection apparatus, and an inkjet head driven by a liquid ejection apparatus.

REFERENCE SIGNS LIST

1 liquid ejection apparatus
2 driving substrate
21 signal generator (generation means, measurement means, and adjustment means)
22 I/O interface
23, 23*a*, 23*b* serializer
24, 24*a*, 24*b* drive signal generation circuit (generation means)
25 unit controller

26 reference signal

27 deserializer (conversion means)

28 heater control generation circuit (generation means)

29 drive data

3 inkjet head (liquid ejection head)

31, 31*a*, 31*b* deserializer (conversion means)

32, 32*a*, 32*b* drive IC (driving means)

33, 33*a*, 33*b* actuator

34, 34*a*, 34*b* nozzle array

35*a*, 35*b* temperature sensor (sensor)

36 serializer

37*a*, 37*b* heater (driving means)

38 drive signal generation circuit

41, 42, 41*a*, 42*a*, 41*b*, 42*b* cable

The invention claimed is:

1. A liquid ejection apparatus that comprises a driving substrate and a liquid ejection head connected to the driving substrate via a cable, the liquid ejection apparatus comprising:

a converter that converts a signal received via the cable from a serial signal to a parallel signal;

a generator that generates a control signal for driving a predetermined driver;

a measurer that measures a conversion delay time of the signal at the converter based on a reference signal which is received by the liquid ejection head from the driving substrate and is converted by the converter together with the signal; and an adjuster that adjusts a timing at which the control signal is outputted from the generator, based on the conversion delay time measured by the measurer.

2. The liquid ejection apparatus according to claim 1, wherein the driving substrate includes the generator, and the generator generates a drive signal for driving the driver, and the liquid ejection head includes the converter, and the driver drives an actuator that causes a plurality of nozzles to eject liquid when the drive signal received via the cable and the signal subjected to parallel conversion by the converter are inputted in the driver.

3. The liquid ejection apparatus according to claim 2 further comprising a plurality of the liquid ejection heads, each of the plurality of liquid ejection heads having a respective converter, wherein the measurer measures a conversion delay time of signals for the each of the plurality of liquid ejection heads, and the adjuster determines an adjustment time for adjusting a timing at which the control signal is outputted, based on the largest conversion delay time among the conversion delay times of the plurality of the liquid ejection heads.

4. The liquid ejection apparatus according to claim 2 further comprising a plurality of the liquid ejection heads, wherein the generator generates a respective control signal for each of the plurality of liquid ejection heads, and the adjuster determines, for each liquid ejection head, an adjustment time for adjusting a timing at which the respective control signal is outputted.

5. The liquid ejection apparatus according to claim 2, wherein the adjuster adjusts a timing at which the control signal is outputted among a plurality of the control signals that is inputted to the driver during a period in which a potential of the drive signal is constant.

6. The liquid ejection apparatus according to claim 1 further comprising a conversion controller that controls the converter, wherein when the conversion delay time exceeds a predetermined value, the conversion controller repeats reconnection of communication of the signal at the converter until the conversion delay time does not exceed the predetermined value.

7. The liquid ejection apparatus according to claim 1, wherein the liquid ejection head includes a sensor that performs a predetermined measurement, the driver is controlled according to a read signal of the sensor, and the driving substrate includes the converter, and the measurer measures a conversion delay time of the read signal at the converter, and the adjuster adjusts a timing at which the control signal from the generator is outputted, based on the conversion delay time of the read signal.

8. A non-transitory computer readable recording medium storing a program causing a computer included in a liquid ejection apparatus that comprises a driving substrate; a liquid ejection head connected to the driving substrate via a cable; a converter that converts a signal received via the cable from a serial signal to a parallel signal, and a generator that generates a control signal for driving a predetermined driver, to function as:

a measurer that measures a conversion delay time of the signal at the converter based on a reference signal which is received by the liquid ejection head from the driving substrate and is converted by the converter together with the signal, and an adjuster that adjusts a timing at which the control signal is outputted from the generator, based on the conversion delay time measured by the measurer.

9. A liquid ejection head that is connected to a driving substrate via a cable and causes a plurality of nozzles to eject liquid based on a signal for causing each of the plurality of nozzles to eject liquid, the liquid ejection head comprising:

a converter that converts a signal received via the cable from a serial signal to a parallel signal, a driver that drives an actuator that causes the nozzles to eject liquid when the signal subjected to parallel conversion by the converter is inputted in the driver, and wherein the converter outputs a reference signal, which is part of the signal converted by the converter, to the driving substrate where a conversion delay time of the signal at the converter is measured based on the reference signal, and wherein the driver is driven by a control signal having a timing adjusted based on the measured conversion delay time.

* * * * *